United States Patent
Hwang et al.

(10) Patent No.: US 11,713,050 B2
(45) Date of Patent: Aug. 1, 2023

(54) METHOD FOR CONTROLLING SWITCHING OF STEERING CONTROL RIGHTS OF AUTONOMOUS VEHICLE

(71) Applicants: Hyundai Motor Company, Seoul (KR); Kia Corporation, Seoul (KR)

(72) Inventors: Sang Woo Hwang, Seoul (KR); Young Dae Park, Asan-Si (KR); Byung Rim Lee, Seongnam-Si (KR); Min Jun Kim, Busan (KR); Se Hyun Chang, Suwon-Si (KR); Hyeon Seok Cho, Pyeongtaek-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 76 days.

(21) Appl. No.: 17/346,140

(22) Filed: Jun. 11, 2021

(65) Prior Publication Data

US 2022/0144295 A1    May 12, 2022

(30) Foreign Application Priority Data

Nov. 11, 2020  (KR) .................. 10-2020-0150232

(51) Int. Cl.
   *B60W 50/08*  (2020.01)
   *B60W 50/035*  (2012.01)
   (Continued)

(52) U.S. Cl.
   CPC ........ *B60W 50/082* (2013.01); *B60W 50/035* (2013.01); *B60W 50/12* (2013.01);
   (Continued)

(58) Field of Classification Search
   None
   See application file for complete search history.

(56) References Cited

U.S. PATENT DOCUMENTS

| 8,825,258 B2 | 9/2014 | Cullinane et al. |
| 9,751,556 B1 * | 9/2017 | Lin .................... B62D 5/0481 |

(Continued)

FOREIGN PATENT DOCUMENTS

| CN | 108749916 A | * 11/2018 | ............... B62D 3/02 |
| JP | H05-50931 A | 3/1993 | |

(Continued)

*Primary Examiner* — Anne Marie Antonucci
*Assistant Examiner* — Amelia Vorce
(74) *Attorney, Agent, or Firm* — Morgan, Lewis & Bockius LLP

(57) ABSTRACT

A method for controlling switching of steering control rights of an autonomous vehicle, may include: performing a control to synchronize a steering angle of a steering wheel and a steering angle of a road wheel, when switching of the steering control rights from an automated driving mode to a manual driving mode is requested. The method further includes: detecting an error value between the steering angle of the steering wheel and the steering angle of the road wheel, when a hands-on state in which the steering wheel is gripped is detected in the synchronization process. In addition, the method further includes: performing a control to switch the mode of the autonomous vehicle to the manual driving mode, when the error value is less than a preset value.

14 Claims, 3 Drawing Sheets

(51) Int. Cl.
  *B60W 50/12* (2012.01)
  *B60W 60/00* (2020.01)
  *B60W 50/00* (2006.01)

(52) U.S. Cl.
  CPC .... *B60W 60/0015* (2020.02); *B60W 60/0053* (2020.02); *B60W 2050/0008* (2013.01); *B60W 2510/202* (2013.01); *B60W 2710/207* (2013.01)

(56) References Cited

U.S. PATENT DOCUMENTS

| | | | | |
|---|---|---|---|---|
| 11,498,618 | B2* | 11/2022 | Aoyama | B62D 6/10 |
| 2005/0234622 | A1 | 10/2005 | Pillar et al. | |
| 2016/0264172 | A1* | 9/2016 | Oiki | B62D 6/02 |
| 2017/0029021 | A1* | 2/2017 | Lee | G05D 1/0088 |
| 2017/0129482 | A1* | 5/2017 | Sunahara | B60W 30/045 |
| 2017/0297565 | A1* | 10/2017 | Joyce | G05D 1/0088 |
| 2018/0229724 | A1 | 8/2018 | Gutmann | |
| 2018/0229767 | A1* | 8/2018 | James | B62D 5/006 |
| 2019/0202494 | A1* | 7/2019 | Itou | B62D 15/025 |
| 2019/0367076 | A1* | 12/2019 | Kim | B62D 5/0409 |
| 2020/0262475 | A1* | 8/2020 | Stahl | B62D 6/001 |
| 2020/0290646 | A1* | 9/2020 | Safour | B60W 60/0057 |
| 2020/0361530 | A1* | 11/2020 | Polmans | B62D 6/10 |
| 2020/0391790 | A1* | 12/2020 | Kamemura | B62D 5/006 |
| 2021/0009197 | A1* | 1/2021 | Kim | B60R 21/01512 |
| 2021/0245791 | A1* | 8/2021 | Krone | B62D 1/181 |
| 2021/0253161 | A1* | 8/2021 | Yoshida | B62D 6/00 |
| 2021/0269087 | A1* | 9/2021 | Zhao | B62D 15/021 |
| 2021/0362781 | A1* | 11/2021 | Jhang | B62D 6/003 |

FOREIGN PATENT DOCUMENTS

| | | | | |
|---|---|---|---|---|
| JP | H09-207799 A | | 8/1997 | |
| JP | H10-329575 A | | 12/1998 | |
| JP | 2007-223494 | | 9/2007 | |
| JP | 2015-174653 | | 10/2015 | |
| KR | 10-2015-0010435 | | 1/2015 | |
| KR | 10-2016-0118182 A | | 10/2016 | |
| KR | 10-2017-0025552 A | | 3/2017 | |
| KR | 10-2018-0138228 A | | 12/2018 | |
| KR | 20190100482 A | * | 8/2019 | ......... B60W 30/182 |
| WO | WO-2018056077 A1 | * | 3/2018 | ............ B62D 5/04 |

* cited by examiner

METHOD FOR CONTROLLING SWITCHING OF STEERING CONTROL RIGHTS OF AUTONOMOUS VEHICLE

CROSS REFERENCE TO RELATED APPLICATION

The present application claims priority to Korean Patent Application No. 10-2020-0150232, filed Nov. 11, 2020, the entire contents of which is incorporated herein for all purposes by this reference.

BACKGROUND OF THE INVENTION

Field of the Invention

The present invention relates to a method for controlling switching of steering control rights of an autonomous vehicle, by which steering control rights of the vehicle may be safely switched by coping with an abnormal situation occurring in a synchronization process when the steering control rights are switched from an automated driving mode to a manual driving mode.

Description of Related Art

A steer-by-wire (SBW) system refers to a steering technology for performing a steering control without mechanical connection between a steering wheel and a road wheel (or tire), but solely by electronic connection and motor driving.

The SBW is characterized in that, since the steering feedback actuator and the road wheel steering actuator are physically separated, the steering wheel can remain stationary even when the road wheel is steered.

These characteristics advantageously make it possible to prevent the steering wheel from continuously rotating as the road wheel rotates during automated driving of the autonomous vehicle, and the steering wheel may be temporarily contained and brought to the driver, only when necessary, to control the vehicle in the manual driving mode.

Meanwhile, it has been provided, when it is necessary to switch from a stationary steering wheel mode to a manual driving mode during autonomous-mode driving, to synchronize (couple) the angle of the road wheel with that of the steering wheel and then to switch to the manual driving mode in the steering wheel hands-on mode.

However, the present approach has a problem in that the same is applicable only to a steering control right switching operation that proceeds in a normal situation. That is, the steering control right switching operation cannot proceed properly in an abnormal situation, such as a hands-on situation in which the driver grips the steering wheel while synchronization proceeds, or a situation in which synchronization fails due to a malfunctioning steering feedback motor.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling switching of steering control rights of an autonomous vehicle, by which steering control rights of the vehicle may be safely switched by coping with an abnormal situation occurring in a synchronization process when the steering control rights are switched from an automated driving mode to a manual driving mode.

In accordance with an aspect of the present invention, a method may include: a coupling operation of, when switching of the steering control rights from an automated driving mode to a manual driving mode is requested, performing a control to synchronize a steering angle of a steering wheel and a steering angle of a road wheel based on an automated driving control command, by a controller; an error detecting operation of, when a hands-on state in which the steering wheel is gripped is detected before the synchronization is completed in the synchronization process, detecting an error value between the steering angle of the steering wheel and the steering angle of the road wheel, by the controller; and a mode switching operation of, when the error value is less than a preset value, performing a control to switch the mode of the autonomous vehicle to the manual driving mode, by the controller.

The error detecting operation may include, when the hands-on state is detected, determining whether the steering wheel is to be steered.

When the steering wheel is steered, steering directions of the steering wheel and the road wheel may be further determined.

The may further include: a torque increasing operation of, when the error value is the preset value or more, increasing a torque of a steering feedback motor such that the steering angle of the steering wheel is synchronized with the steering angle of the road wheel according to the automated driving control command; and a road wheel controlling operation of, when the steering torque of the steering feedback motor is more than a reference torque, performing a control to restrain abrupt steering rotation of the road wheel through control of a speed of the road wheel while steering the road wheel according to the steering angle of the steering wheel.

The road wheel controlling operation may include, when the error value is less than the preset value, performing a control to switch the mode of the autonomous vehicle to the manual driving mode.

The road wheel controlling operation may further include a steering wheel controlling operation of, when the hands-off state in which the steering wheel is not gripped is detected, restraining abrupt steering rotation of the steering wheel through control of a speed of the steering wheel.

The steering wheel controlling operation may include, when the error value is less than the preset value and the hands-on state is detected, performing a control to switch the mode of the autonomous vehicle to the manual driving mode.

The steering wheel controlling operation may include, when the hands-off state is detected, controlling the mode of the autonomous vehicle to the automated driving mode.

The steering wheel controlling operation may include, when the error value is less than the preset value and the hands-off state is detected, controlling the steering angle of the steering wheel and the steering angle of the road wheel in a synchronized automated driving mode.

The method may further include: a failure determining operation of determining whether the steering feedback motor fails in a coupling operation, wherein, when the steering feedback motor fails and a hands-off state in which the steering wheel is not gripped is detected, the autonomous vehicle may be controlled in a danger minimizing automated driving mode.

When steering feedback motor fails and a hands-on state in which the steering wheel is gripped is detected, a control may be performed to start an error detecting operation.

The present invention is advantageous, through the above-described configuration, in that the driver can switch the steering control rights safely and intuitively in an abnormal situation such as a case in which the driver steers the steering wheel before synchronization between the steering wheel and the road wheel is completed in a process of switching from the automated driving mode to the manual driving mode, or a case in which synchronization cannot proceed due to a failed steering feedback.

Moreover, present invention is advantageous in that the driver's control input may be immediately reflected on the vehicle when the driver's steering intervenes, even though the location of the steering wheel is being controlled through the steering feedback system such that the steering control rights may be switched more safely by switching the steering control rights only when the driver's steering intention is sufficient even in an abnormal situation in which the driver grips the steering wheel and then releases the same during the synchronization process.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
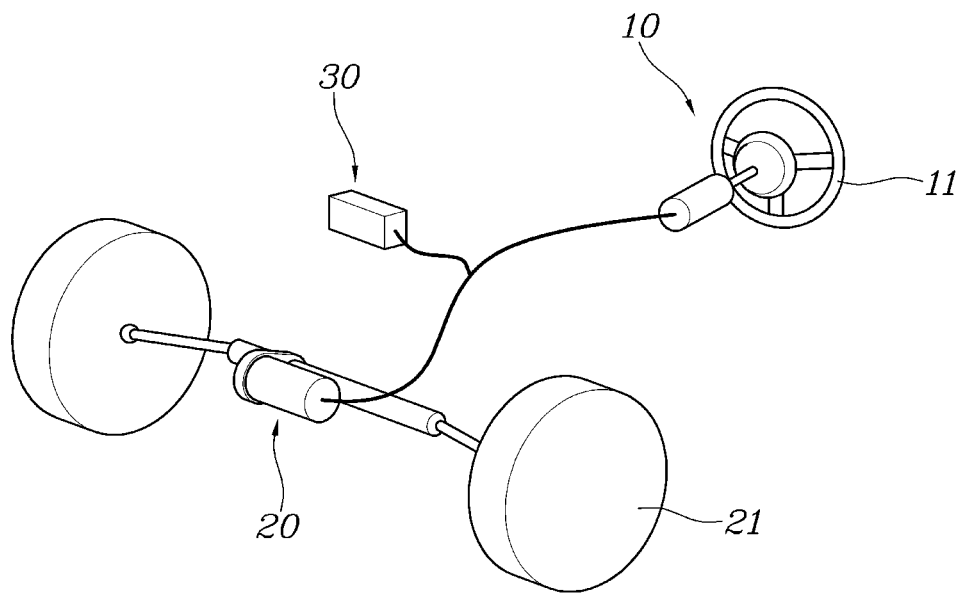
FIG. 1 is a view schematically illustrating an SBW system which is applicable to the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will be described in detail with reference to the accompanying drawings.

FIG. 1 is a view schematically illustrating an SBW system which is applicable to the present invention, and the SBW system largely includes a steering feedback actuator (SFA) 10, a road wheel steering actuator (RSA) 20, and an automated driving controller (ADC) 30.

The steering feedback actuator 10 may be provided with a steering feedback motor that provides steering feedback to the steering wheel 11 and may be provided with a sensor that detects the steering angle $\theta_{SW}$ and the steering torque $T_{SW}$ of the steering wheel 11, and a steering feedback controller that is configured to control the steering feedback motor according to steering information related to the steering wheel 11 may be provided in the steering feedback actuator 10.

The sensor may be a steering angle sensor and a steering torque sensor, but a steering sensor which may collectively detect the steering angle and the steering torque may be applied as the sensor.

Furthermore, the road wheel steering actuator 20 may be provided with a steering motor that provides a steering force to the road wheel 21, and a road wheel steering controller which is connected to the steering feedback controller to control the steering motor may be provided in the road wheel steering actuator 20. The road wheel steering controller may detect the degree of rotation of the steering motor, the degree of movement of a rack bar, and the like to determine the steering angle $\theta_{RW}$ of the road wheel 21.

Data that reflect the driving state of the vehicle are input to the automated driving controller 30 through communication, cables, or the like, and the automated driving controller 30 is connected to the steering feedback controller and the road wheel steering controller to apply a control command to the steering feedback controller and the road wheel steering controller in the automated driving mode or a process of switching modes to control the operations of the steering feedback actuator 10 and the road wheel steering actuator 20.

Figure 2:
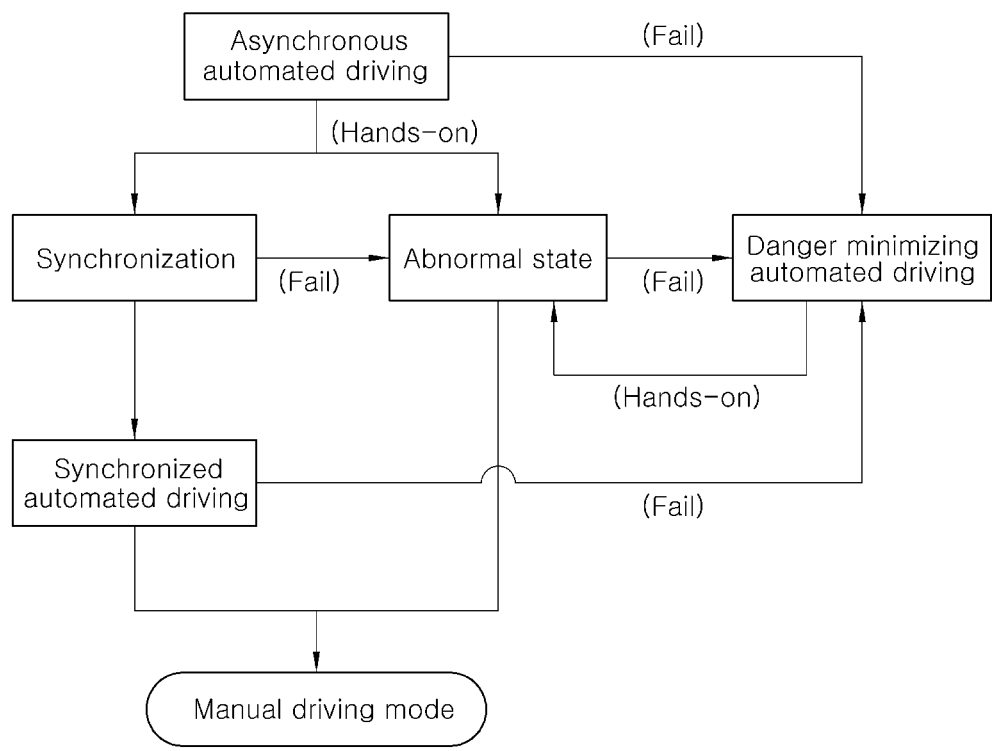
FIG. 2 is a view schematically illustrating a process of controlling switching of steering control rights according to various exemplary embodiments of the present invention.

FIG. 2 is a view schematically illustrating a process of controlling switching of steering control rights according to various exemplary embodiments of the present invention.

Referring to the drawing, the present invention includes: a coupling operation of, when switching of the steering control rights from an automated driving mode to a manual driving mode is requested, performing a control to synchronize a steering angle $\theta_{SW}$ of a steering wheel 11 and a steering angle $\theta_{RW}$ of a road wheel 21 based on an automated driving control command, by a controller; an error detecting operation of, when a hands-on state, in which the steering wheel 11 is gripped, is detected before the synchronization is completed in the synchronization process, detecting an error value $\theta_{err}$ between the steering angle $\theta_{SW}$ of the steering wheel 11 and the steering angle $\theta_{RW}$ of the road wheel 21, by the controller; and an operation of, when the error value is less than a preset value, performing a control to switch the mode of the autonomous vehicle to the manual driving mode, by the controller.

For example, in the automated driving mode, the road wheel 21 is controlled according to a command of the automated driving controller whereas the steering wheel 11 is not steered, whereby an asynchronous automated driving state, in which the steering wheel 11 and the road wheel 21 are not synchronized with each other, may occur.

That is, if a request for synchronization is made in the asynchronous automated driving state, the steering wheel 11 as well as the road wheel 21 are controlled according the command of the automated driving controller so that the rotational angles of the road wheel 21 and the steering wheel 11 are transited to a synchronized coupling state.

However, when the driver grips the steering wheel 11 before the synchronization is finished, there is a difficulty in performing synchronization through the steering feedback motor.

If the difference between the steering angle $\theta_{SW}$ of the steering wheel 11 and the steering angle $\theta_{RW}$ of the road wheel 21 decreases as the driver steers the steering wheel 11 while gripping the steering wheel 11, it is determined that the steering wheel 11 and the road wheel 21 are completely aligned and the mode of the autonomous vehicle is switched to the manual driving mode in which the steering control right is handed over to the driver.

Accordingly, as a measure for an abnormal situation, in which the driver grips the steering wheel 11 before the synchronization, the steering control right may be handed over to the driver safely and intuitively.

For reference, the controller according to various exemplary embodiments of the present invention may be implemented by an algorithm configured to control operations of various elements of the vehicle, a nonvolatile memory configured to store data on a software instruction for reproducing the algorithm, and a processor configured to perform an operation, which will be described below, by use of the data stored in the memory. Here, the memory and the processor may be implemented by individual chips. Alternatively, the memory and the processor may be implemented by an integrated single chip. The processor may take the form of one or more processors.

The controller may be a controller that performs the functions of a steering feedback controller, a road wheel steering controller, and an automated driving controller.

Figure 3:
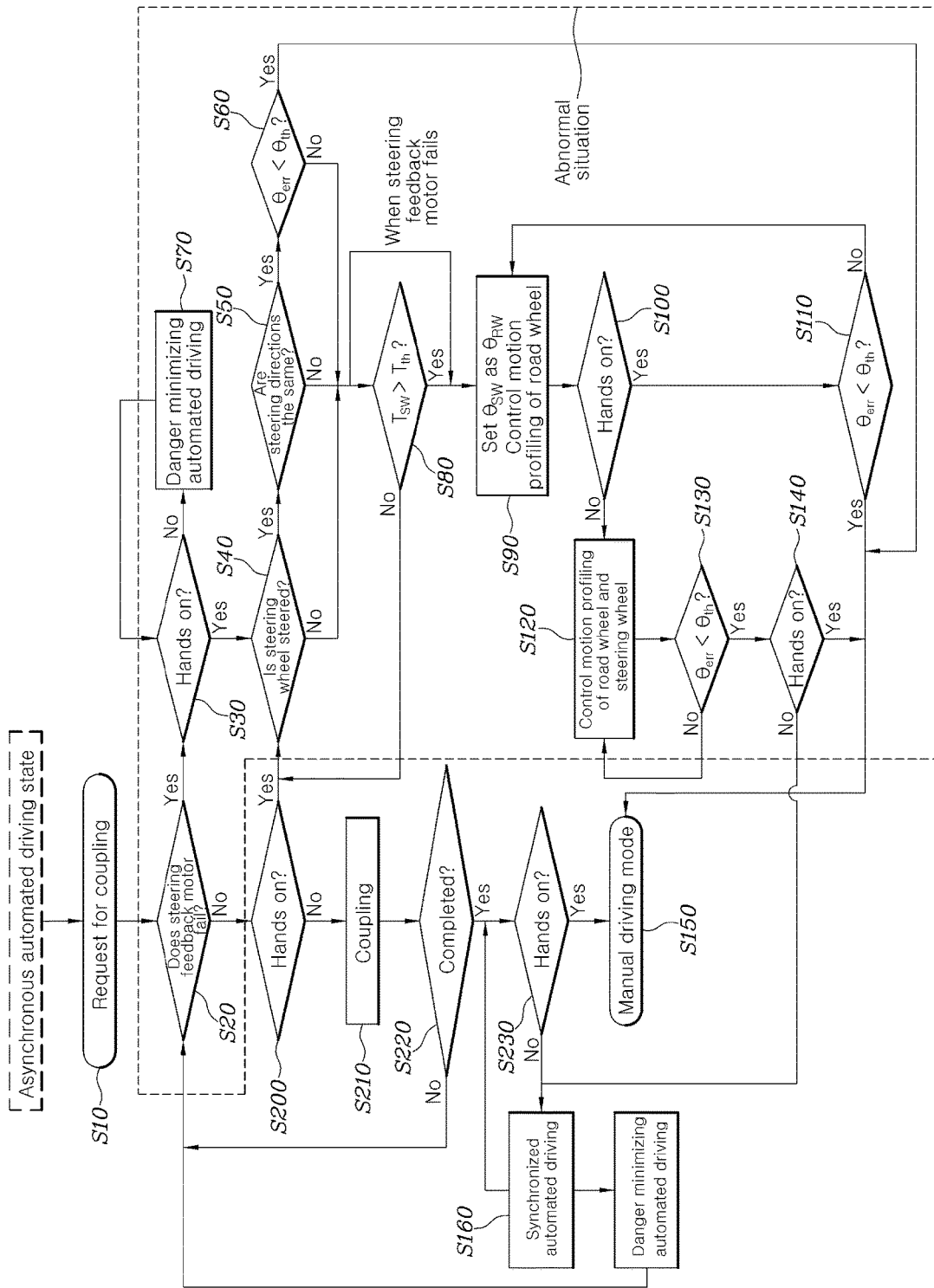
FIG. 3 is a view exemplifying an overall flow of control of switching of steering control rights according to various exemplary embodiments of the present invention.

FIG. 3 is a view exemplifying an overall flow of control of switching of steering control rights according to various exemplary embodiments of the present invention.

Referring to the drawing, in the error detecting operation, when the hands-on state is detected, it may be further determined whether the steering wheel 11 is to be steered. It may be further determined whether the steering wheel 11 is to be steered, by detecting the steering torque value and it may be determined whether the steering wheel 11 is in a hands-on or hands-off state, through a known hands-on/off determining method, and a description of a detailed method for determining whether the steering wheel 11 is in a hands-on or hands-off state will be omitted.

In the error detecting operation, when the steering wheel 11 is steered, the steering directions of the steering wheel 11 and the road wheel 21 may be further determined.

That is, when the steering wheel 11 is steered to be rotated in the same direction as the road wheel 21 in a state in which the driver grips the steering wheel 11, the driver rotates the steering wheel 11 in the direction of synchronization of the steering wheel 11 and the road wheel 21 and assists the steering feedback motor as a result.

Accordingly, because the coupling (synchronization) of the steering wheel 11 and the road wheel 21 is completed and the steering intention of the driver to rotate the steering wheel 11 in the hands-on state is apparent when an error value $\theta_{err}$ which is the difference of the angles of the steering wheel 11 and the road wheel 21 is less than a preset value $\theta_{th}$, the mode of the autonomous vehicle is directly switched to the manual driving mode.

However, the present invention may further include: a torque increasing operation of, when the error value $\theta_{err}$ is the preset value $\theta_{th}$ or more in the error $\theta_{err}$ detecting result of the error detecting operation, increasing a torque of a steering feedback motor such that the steering angle $\theta_{SW}$ of the steering wheel 11 is synchronized with the steering angle $\theta_{RW}$ of the road wheel 21 according to the automated driving control command; and a road wheel controlling operation of when the steering torque $T_{SW}$ of the steering feedback motor is more than a reference torque $T_{th}$, performing a control to restrain abrupt steering rotation of the road wheel 21 through control of a speed of the road wheel 21 while steering the road wheel 21 according to the steering angle $\theta_{SW}$ of the steering wheel 11.

For example, when the steering wheel 11 is gripped without being steered in the hands-on state of the steering wheel 11, when the steering wheel 11 is steered in a direction which is opposite to the direction of the road wheel 21 while the driver is steering the steering wheel 11, or the steering wheel 11 is steered slower than the steering rotation speed of the road wheel 21 while the steering wheel 11 is being steered in the same direction as the direction of the road wheel 21, the steering angle $\theta_{SW}$ of the steering wheel 11 is controlled to be synchronized with the steering angle $\theta_{RW}$ of the road wheel 21 by increasing the torque of the steering feedback motor in a response to the automated driving control command.

Here, the location of the steering wheel 11 by the steering feedback motor is controlled by use of an impedance (admittance) control which is a location based torque control, and an input by the driver may be immediately reflected on the vehicle when the torque of the driver is input even when the location control is made by the steering feedback motor.

The principle of an impedance control in a method of converting a measured input (force) to a corrected location value through an impedance filter and reflecting the corrected location value on a target location will be described with reference to FIG. 4A and FIG. 4B.

Figure 4A:
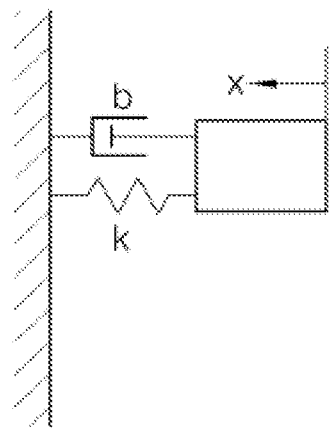
FIGS. 4A and 4B are views exemplarily illustrating a principle of controlling an impedance which is applied to the present invention.

FIG. 4A illustrates a general physical system, and for example, the behavior of an object is determined according to a mass m, a damping factor b, and a spring constant k if a force off is applied to the object, and a person that applies the force of f to the object feels the behavior as repulsive feedback. The will be expressed in an equation as follows.

$$m\ddot{x}+b\dot{x}+kx=f$$

Figure 4B:
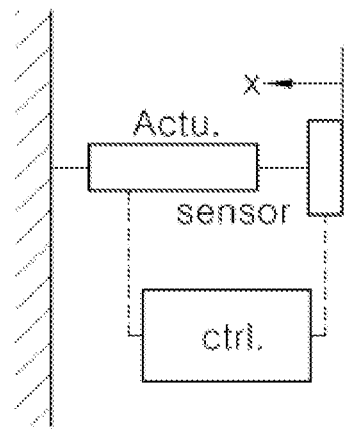

FIG. 4B illustrates a mechanical system that simulates the physical system of FIG. 4A, and for example, a person who applies a force to an object feels the behavior of FIG. 4A by measuring a force f by a force sensor if the force f is applied to the object, determining the location, the speed, and the acceleration, which are necessary, by use of a differential equation according to $m_d$, $b_d$, and $k_d$, which are set to make a target behavior (the behavior of FIG. 4A) for the measured force f by the controller, and thus realizing them in an actuator.

This is utilized in control of the location of the steering wheel 11, and an override which may reflect intervening of the driver during automated driving may be realized by performing a location control while the target steering angle is taken as the target location value of the steering wheel 11 and performing a location control of the steering wheel 11 by generating a corrected location value such that a behavior designed for the steering torque input (a current of a sensor or the steering feedback motor) of the driver may be achieved.

That is, in an existing general location control, when the driver steers the steering wheel 11, it is difficult to reflect a control input of the driver on the behavior of the vehicle as the steering by the driver is recognized as external turbulence, but an input by the driver may be accommodated (an impedance model) in an impedance control during a coupling control of the SBW system of the present invention while the automated driving mode is maintained (a location based control), and the driver may be made to feel a suitable torque during steering (an impedance control).

In the present way, if the steering torque $T_{SW}$ exceeds a reference torque $T_{th}$ as the steering torque of the steering feedback motor increases according to the location control of the steering wheel 11, the control command of the road wheel 21 is converted to the steering angle of the steering feedback system by the automated driving controller 30 while the steering intention of the driver is reflected.

However, because a torque is not generated by the steering feedback motor when the steering feedback motor fails, the steering torque $T_{SW}$ and the reference torque $T_{th}$ are not compared.

Subsequently, because the driving stability of the vehicle may be disturbed if the road wheel 21 is abruptly rotated to follow the steering angle $\theta_{SW}$ of the steering wheel 11 when the error value $\theta_{err}$ which is a difference between the steering angle $\theta_{SW}$ of the steering wheel 11 and the steering angle $\theta_{RW}$ of the road wheel 21 is large, a motion profiling control for making the movement of the road wheel 21 according to the steering angle $\theta_{RW}$ is performed to prevent an abrupt change of the steering angle of the road wheel 21.

The motion profiling control is made to control a speed of the road wheel 21, and a principle of controlling motion profiling applied to the road wheel 21 will be described with reference to FIG. 5A and FIG. 5B.

Figure 5A:
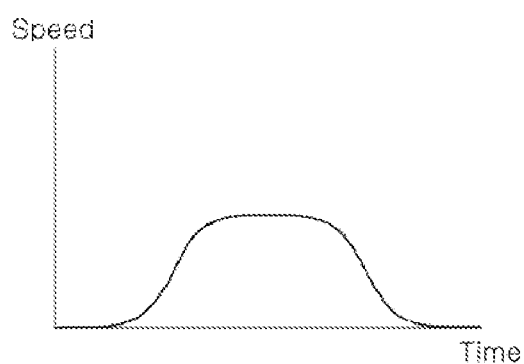
FIG. 5A and FIG. 5B are views exemplarily illustrating a principle of controlling motion profiling which is applied to a steering wheel and a road wheel according to various exemplary embodiments of the present invention.
Figure 5B:
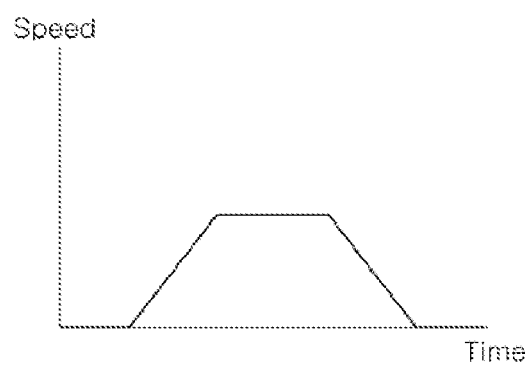

Profile forms through motion profiling for making a change in rotational angle, which is representative as a strategy for making a smooth motion in a point-to-point location control, include an s-curve profile illustrated in FIG. 5A and a trapezoidal profile illustrated in FIG. 5B, and both of the two methods control speed values to reduce jerking.

However, the motion profiling described in various exemplary embodiments of the present invention exemplifies a general technology for controlling speed to prevent an abrupt change in the rotation of the road wheel 21, and most simply may be realized by placing a limit on a speed control but other technologies for preventing an abrupt change of rotation also may be applied.

For reference, an abrupt control such as a step input occurs if a target location is input without any strategy, and the driving stability may be disturbed as the road wheel 21 is abruptly rotated.

Subsequently, referring to FIG. 3, in the road wheel controlling operation, when the error value $\theta_{err}$ is less than the preset value $\theta_{th}$, the mode of the autonomous vehicle may be controlled to be switched to the manual driving mode.

That is, if the error value $\theta_{err}$ decreases to the reference value or less in the motion profiling process of the road wheel 21, the mode of the autonomous vehicle is switched to the manual driving mode in which the steering control right is completely handed over to the driver.

Meanwhile, in the road wheel controlling operation, the present invention may further include a steering wheel 11 controlling operation of, when the hands-off state, in which the steering wheel 11 is not gripped, is detected, restraining abrupt steering rotation of the steering wheel 11 through control of the speed of the steering wheel 11.

That is, if the driver releases the hands from the steering wheel 11 in the motion profiling control process of the road wheel 21, the steering wheel 11 also carries out a motion profiling control to prevent an abrupt motion of the steering wheel 11 while maintaining the original motion profiling control of the road wheel 21.

Furthermore, in the steering wheel 11 controlling operation, when the error value $\theta_{err}$ is less than the preset value $\theta_{th}$ and the hands-on state is detected, the mode of the autonomous vehicle may be controlled to be switched to the manual driving mode.

That is, when it is determined that the road wheel 21 and the steering wheel 11 are synchronized in a process of a motion profiling control of the road wheel 21 and the steering wheel 11 and the driver grips the steering wheel 11, the mode of the autonomous vehicle is switched to the manual driving mode in which the steering control right is completely handed over to the driver.

Meanwhile, when a hands-off state is detected in the steering wheel 11 controlling operation, the autonomous vehicle may be controlled in the automated driving mode.

In detail, when the error value $\theta_{err}$ is less than the preset value $\theta_{th}$ in the steering wheel 11 controlling operation and a hands-off state is detected, the vehicle may be controlled in the automated driving mode, in which the steering angle $\theta_{SW}$ of the steering wheel 11 and the steering angle $\theta_{RW}$ of the road wheel 21 are synchronized.

That is, when it is determined that the road wheel 21 and the steering wheel 11 are synchronized in a process of a motion profiling control of the road wheel 21 and the steering wheel 11 but the driver does not grip the steering wheel 11, the automated driving mode, in which the steering angle $\theta_{SW}$ of the steering wheel 11 and the steering angle $\theta_{RW}$ of the road wheel 21 are synchronized, is maintained.

Meanwhile, the present invention further includes a failure determining operation of determining whether the steering feedback motor fails in the coupling operation.

When the steering feedback motor fails and a hands-off state, in which the steering wheel 11 is not gripped, is detected, the vehicle may be controlled in the automated driving mode.

However, when the steering feedback motor fails and a hands-on state, in which the steering wheel 11 is gripped, is detected, the error detecting operation is started and the error value $\theta_{err}$ is detected, the mode of the autonomous vehicle may be controlled to be switched to the manual driving mode when the error value $\theta_{err}$ is less than the preset value $\theta_{th}$.

That is, because the driver may steer the vehicle even though the steering feedback motor fails in the hands-on state when the steering feedback motor fails, the control of switching the mode of the autonomous vehicle to the manual driving mode is continued.

However, because the driver cannot steer the vehicle in the hands-off state, the steering of the autonomous vehicle is controlled in a danger minimizing automated driving mode. Here, because the danger minimizing automated driving mode corresponds to a state, in which the steering feedback motor cannot be driven, the fact that the steering feedback motor fails may be displayed on a cluster or be informed of through a sound.

In an overall description of the process of controlling switching of steering control rights according to various exemplary embodiments of the present invention with reference to FIG. 3, when a request for switching the steering control right to the manual driving mode while the autonomous travels in a state in which the steering wheel 11 and the road wheel 21 are not synchronized (S10), it is determined whether the steering feedback motor fails in a process of coupling the steering wheel 11 and the road wheel 21 (S20).

Furthermore, in operation S20, it is determined whether the state of the autonomous vehicle is in a hands-on state, in which the hands of the driver grip steering wheel 11, regardless of the failure of the steering feedback motor (S30 and S200).

Accordingly, when the steering feedback fails, it is determined whether the state of the autonomous vehicle is in a hands-on state in operation S30, and it is determined whether the steering wheel 11 is steered by the driver when it is determined that the state of the autonomous vehicle is in a hands-on state (S40).

When it is determined in operation S40 that the driver does not steer the steering wheel 11, the torque of the steering feedback motor increases such that the steering angle $\theta_{SW}$ of the steering wheel 11 is synchronized with the steering angle $\theta_{RW}$ of the road wheel 21, and then it is determined whether the steering torque $T_{SW}$ of the steering wheel 11 is more than the reference torque $T_{th}$ (S80).

Meanwhile, when it is determined in operation S40 that the steering wheel is steered, it is determined whether the steering direction of the steering wheel 11 and the steering direction of the road wheel 21 are the same (S50).

When it is determined in operation S50 that the rotation directions of the steering wheel 11 and the road wheel 21 are opposite to each other, the torque of the steering feedback motor increases such that the steering angle $\theta_{SW}$ of the steering wheel 11 is synchronized with the steering angle $\theta_{RW}$ of the road wheel 21, and then it is determined whether the steering torque $T_{SW}$ of the steering wheel 11 is more than the reference torque $T_{th}$ (S80).

Meanwhile, when it is determined in operation S50 that the rotation directions of the steering wheel 11 and the road wheel 21 are the same, it is determined whether the error value $\theta_{err}$ which is a difference of the steering angle $\theta_{SW}$ of the steering wheel 11 and the steering angle $\theta_{RW}$ of the road wheel 21 is less than the preset value $\theta_{th}$ (S60).

Accordingly, when it is determined in operation S60 that the error value $\theta_{err}$ is less than the preset value $\theta_{th}$, the driving mode of the vehicle is switched from the automated driving mode to the manual driving mode (S150).

Meanwhile, when it is determined in operation S60 that the error value $\theta_{err}$ is the preset value $\theta_{th}$ or more, the torque of the steering feedback motor increases such that the steering angle $\theta_{SW}$ of the steering wheel 11 is synchronized with the steering angle $\theta_{RW}$ of the road wheel 21, and then it is determined whether the steering torque $T_{SW}$ of the steering wheel 11 is more than the reference torque $T_{th}$ (S80).

However, operation S80, which is performed in the present way, may be performed, and when it is determined that the state of the autonomous vehicle is a hands-on state in which the steering feedback motor is normal, and when the steering feedback motor fails, the comparison in operation S80 is not performed and operation S90, which will be described below, is performed.

Meanwhile, when it is determined in operation S80 that the steering torque $T_{SW}$ is more than the reference torque $T_{th}$, the road wheel 21 is steered according to the steering angle $\theta_{SW}$ of the steering wheel 11, and a motion profiling control of restraining abrupt steering rotation of the road wheel 21 is performed through control of a speed of the road wheel 21 (S90).

Subsequently, it is determined whether the state of the autonomous vehicle is in a hands-on state in the motion profiling control process (S100), and it is determined whether the error value $\theta_{err}$ is less than the preset value $\theta_{th}$ in the hands-on state (S110).

Accordingly, when it is determined in operation S110 that the error value $\theta_{err}$ is less than the preset value $\theta_{th}$, the driving mode of the vehicle is switched from the automated driving mode to the manual driving mode (S150).

Meanwhile, when it is determined in operation S100 that the state of the autonomous vehicle is in a hands-off state, abrupt rotation of the road wheel 21 and the steering wheel 211 is restrained by performing a motion profiling control for the steering wheel 11 while performing a motion profiling control of steering the road wheel 21 according to the steering angle $\theta_{SW}$ of the steering wheel 11 (S120).

Subsequently, it is determined whether the error value $\theta_{err}$ is less than the preset value $\theta_{th}$ (S130), and it is determined whether the state of the steering wheel 11 is a hands-on state when the error value $\theta_{err}$ is less than the preset value $\theta_{th}$ (S140).

Accordingly, when it is determined in operation S140 that the steering wheel 11 is in a hands-on state, the driving mode of the vehicle is switched from the automated driving mode to the manual driving mode (S150).

Meanwhile, when it is determined in operation S140 that the steering wheel 11 is in a hands-off state, the driving mode of the vehicle is switched to the automated driving mode in a state in which the road wheel 21 and the steering wheel 11 are synchronized (S160).

Accordingly, when the mode of the autonomous vehicle is switched to the automated driving mode in the synchronization state, the automated driving controller controls the steering angle $\theta_{SW}$ and the road wheel 21 is controlled through the detecting value for the steering angle.

Meanwhile, because the steering feedback motor fails when it is determined in operation S30 that the state of the autonomous vehicle is in a hands-off state, the driving mode of the vehicle is switched to the danger minimizing automated driving mode (S70), and the driver is alerted of the failure state of the steering feedback motor.

For reference, when it is determined in operation S20 that the steering feedback motor is normal, it is determined whether the steering wheel 11 is in a hands-on state (S200).

When it is determined that the steering wheel 11 is in a hands-on state, operation S40 is started, whereas when it is determined that the steering wheel 11 is in a hands-off state, the steering wheel 11 and the road wheel 21 are synchronized (coupled) (S210).

Furthermore, it is determined whether the synchronization is finished (S220), and when the synchronization is finished, it is determined whether the steering wheel 11 is in a hands-on state (S230).

When it is determined in operation S230 that the steering wheel 11 is in a hands-on state, the driving mode of the vehicle is switched to the manual driving mode (S150).

Meanwhile, when it is determined that the steering wheel 11 is in a hands-off state, the driving mode of the vehicle is switched to the automated driving mode in a state in which the road wheel 21 and the steering wheel 11 are synchronized (S160). That is, when the mode of the autonomous vehicle is switched to the automated driving mode, the automated driving controller controls the steering angle $\theta_{SW}$ and the road wheel 21 is controlled through the sensing value for the steering angle.

As described above, according to various exemplary embodiments of the present invention, a driver can switch the steering control rights safely and intuitively in an abnormal situation, such as a case in which the driver steers the steering wheel 11 before the synchronization of the steering wheel 11 and the road wheel 21 is finished in a process of switching the automated driving mode to the manual driving mode or a case in which the synchronization cannot be performed due to a failure of the steering feedback.

Furthermore, because a control input by the driver may be immediately reflected on the vehicle when the steering by the driver intervenes even though the location of the steering wheel 11 is being controlled through the steering feedback system, the steering control rights may be switched more safely by switching the steering control rights only when the steering intention of the driver is sufficient even in an abnormal situation in which the driver grips the steering wheel 11 and in turn releases the steering wheel 11 during the synchronization process.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling switching of steering control right of a vehicle, the method comprising:
   upon determining that switching of the steering control right from an automated driving mode to a manual driving mode is requested, performing a control to synchronize a steering angle of a steering wheel and a steering angle of a road wheel according to an automated driving control command, by a controller including a processor;
   upon determining that a hands-on state in which the steering wheel is gripped is detected before the synchronization is completed in a synchronization process, detecting an error value between the steering angle of the steering wheel and the steering angle of the road wheel, by the controller; and
   upon determining that the error value is less than a predetermined value, performing a control to switch a mode of the vehicle to the manual driving mode, by the controller,
   upon determining that the error value is equal to or greater than the predetermined value, increasing a torque of a steering feedback motor so that the steering angle of the steering wheel is synchronized with the steering angle of the road wheel according to the automated driving control command; and
   upon determining that the steering torque of the steering feedback motor is more than a reference torque, performing a control to restrain an abrupt steering rotation of the road wheel through control of a speed of the road wheel while steering the road wheel according to the steering angle of the steering wheel,
   wherein the detecting the error value between the steering angle of the steering wheel and the steering angle of the road wheel includes:
      upon determining that the hands-on state is detected, determining when the steering wheel is to be steered, and
   wherein the performing the control to restrain the abrupt steering rotation of the road wheel includes:
      upon determining that a hands-off state in which the steering wheel is not gripped is detected, restraining the abrupt steering rotation of the steering wheel through control of a speed of the steering wheel.

2. The method of claim 1, wherein, upon determining that the steering wheel is steered, steering directions of the steering wheel and the road wheel are further determined.

3. The method of claim 1, wherein the performing the control to restrain the abrupt steering rotation of the road wheel further includes:
   upon determining that the error value is less than the predetermined value, performing a control to switch the mode of the vehicle to the manual driving mode.

4. The method of claim 1, wherein the restraining the abrupt steering rotation of the steering wheel includes:
   upon determining that the error value is less than the predetermined value and the hands-on state is detected, performing a control to switch the mode of the vehicle to the manual driving mode.

5. The method of claim 1, wherein the restraining the abrupt steering rotation of the steering wheel includes:
   upon determining that the hands-off state is detected, switching the mode of the vehicle to the automated driving mode.

6. The method of claim 1, wherein the restraining the abrupt steering rotation of the steering wheel includes:
   upon determining that the error value is less than the predetermined value and the hands-off state is detected, controlling the steering angle of the steering wheel and the steering angle of the road wheel in a synchronized automated driving mode.

7. The method of claim 1, further including:
   determining, by the controller, when a steering feedback motor fails in a coupling operation,
   wherein, upon determining that the steering feedback motor fails and the hands-off state in which the steering wheel is not gripped is detected, the vehicle is controlled by the controller, in a danger minimizing automated driving mode.

8. The method of claim 7, wherein, upon determining that the steering feedback motor fails and the hands-on state in which the steering wheel is gripped is detected, the controller is configured to start an error detecting operation.

9. A steer-by-wire apparatus of controlling switching of a steering control right of a vehicle, the SBW apparatus comprising:

a steering feedback actuator including a steering feedback motor and a sensor configured for detecting a steering angle and a steering torque of a steering wheel of the vehicle;

a road wheel steering actuator providing a steering force to a road wheel of the vehicle; and a controller including a processor, connected to the steering feedback actuator and the road wheel steering actuator, and configured for determining a steering angle of the road wheel, wherein the controller is configured for:
performing a control to synchronize the steering angle of the steering wheel and the steering angle of the road wheel by controlling the steering feedback actuator and the road wheel steering actuator according to an automated driving control command, upon determining that switching of the steering control right from an automated driving mode to a manual driving mode is requested;

detecting an error value between the steering angle of the steering wheel and the steering angle of the road wheel, upon determining that a hands-on state in which the steering wheel is gripped is detected before the synchronization is completed in a synchronization process; and switching a mode of the vehicle to the manual driving mode, upon determining that the error value is less than a predetermined value, wherein in detecting the error value between the steering angle of the steering wheel and the steering angle of the road wheel, the controller is configured to determine when the steering wheel is to be steered, upon determining that the hands-on state is detected, wherein upon determining that the error value is equal to or greater than the predetermined value, the controller is configured to increase a torque of the steering feedback motor so that the steering angle of the steering wheel is synchronized with the steering angle of the road wheel according to the automated driving control command, wherein upon determining that the steering torque of the steering feedback motor is more than a reference torque, the controller is configured to restrain an abrupt steering rotation of the road wheel through control of a speed of the road wheel while steering the road wheel according to the steering angle of the steering wheel, and wherein in restraining the abrupt steering rotation of the road wheel, the controller is configured to switch the mode of the vehicle to the manual driving mode, upon determining that the error value is less than the predetermined value and is configured to restrain the abrupt steering rotation of the steering wheel through control of the speed of the steering wheel, upon determining that a hands-off state in which the steering wheel is not gripped is detected.

10. The SBW apparatus of claim 9, wherein, upon determining that the steering wheel is steered, the controller is configured to determine steering directions of the steering wheel and the road wheel.

11. The SBW apparatus of claim 9, wherein in restraining the abrupt steering rotation of the steering wheel, the controller is configured to switch the mode of the vehicle to the manual driving mode, upon determining that the error value is less than the predetermined value and the hands-on state is detected, and is configured to switch the mode of the vehicle to the automated driving mode upon determining that the hands-off state is detected.

12. The SBW apparatus of claim 9, wherein in restraining the abrupt steering rotation of the steering wheel, the controller is configured to control the steering angle of the steering wheel and the steering angle of the road wheel in a synchronized automated driving mode, upon determining that the error value is less than the predetermined value and the hands-off state is detected.

13. The SBW apparatus of claim 9,
wherein the controller is configured to determine when the steering feedback motor fails in a coupling operation, and wherein, upon determining that the steering feedback motor fails and the hands-off state in which the steering wheel is not gripped is detected, the controller is configured to control the vehicle in a danger minimizing automated driving mode.

14. The SBW apparatus of claim 13, wherein, upon determining that the steering feedback motor fails and the hands-on state in which the steering wheel is gripped is detected, the controller is configured to start an error detecting operation.

* * * * *